(12) United States Patent
Gacoin et al.

(10) Patent No.: US 10,254,568 B2
(45) Date of Patent: Apr. 9, 2019

(54) PROCESS FOR MANUFACTURING AN OPHTHALMIC LENS EQUIPPED WITH AN INSERT

(71) Applicant: Essilor International, Charenton-le-Pont (FR)

(72) Inventors: Eric Gacoin, Charenton-le-Pont (FR); Mathieu Meynen, Charenton-le-Pont (FR); Thierry Devanneaux, Charenton-le-Pont (FR); Ludovic Jouard, Charenton-le-Pont (FR); Chefik Habassi, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/125,449

(22) PCT Filed: Mar. 16, 2015

(86) PCT No.: PCT/EP2015/055429
§ 371 (c)(1),
(2) Date: Sep. 12, 2016

(87) PCT Pub. No.: WO2015/140103
PCT Pub. Date: Sep. 24, 2015

(65) Prior Publication Data
US 2017/0097523 A1    Apr. 6, 2017

(30) Foreign Application Priority Data
Mar. 18, 2014    (EP) .................................... 14305376

(51) Int. Cl.
*G02C 11/00*    (2006.01)
*B29D 11/00*    (2006.01)
(Continued)

(52) U.S. Cl.
CPC ........ *G02C 11/10* (2013.01); *B29D 11/00692* (2013.01); *G02B 27/0172* (2013.01);
(Continued)

(58) Field of Classification Search
CPC .... G02C 11/10; G02C 7/02; B29D 11/00692; G02B 27/0172; G02B 2027/0178
(Continued)

(56) References Cited

U.S. PATENT DOCUMENTS 5,240,668 A     8/1993   Garza
2009/0256977 A1  10/2009  Haddock et al.

FOREIGN PATENT DOCUMENTS

GB       579752        8/1946
WO    2011095379      8/2011
(Continued)

*Primary Examiner* — Tuyen Tra
(74) *Attorney, Agent, or Firm* — Oblon, McClelland, Maier & Neustadt, L.L.P.

(57) ABSTRACT

The invention relates to a process for manufacturing an ophthalmic lens equipped with an insert (1), by means of a mold, comprising: —a step of molding a puck (3) comprising two faces (3A, 3B) and said insert (1) positioned between said faces; and —a step of machining at least one of said faces (3A, 3B) of said puck in order to form one of the front or back faces of said ophthalmic lens, the insert (1) being positioned relative to one portion of the mold before said molding step, According to the invention, an element associated with the insert or an imprint of this element left in the puck after the element has been removed comprises at least one of its portions providing a positional reference relative to said insert (1) in the machining step.

20 Claims, 7 Drawing Sheets

(51) Int. Cl.
 *G02C 7/08* (2006.01)
 *G02B 27/01* (2006.01)
 *G02C 7/02* (2006.01)

(52) U.S. Cl.
 CPC ............... *G02C 7/02* (2013.01); *G02C 7/086* (2013.01); *G02B 2027/0178* (2013.01)

(58) Field of Classification Search
 USPC .................................................. 351/158, 41
 See application file for complete search history.

(56) References Cited

FOREIGN PATENT DOCUMENTS

| | | |
|---|---|---|
| WO | 2012/004089 | 1/2012 |
| WO | 2012/004090 | 1/2012 |

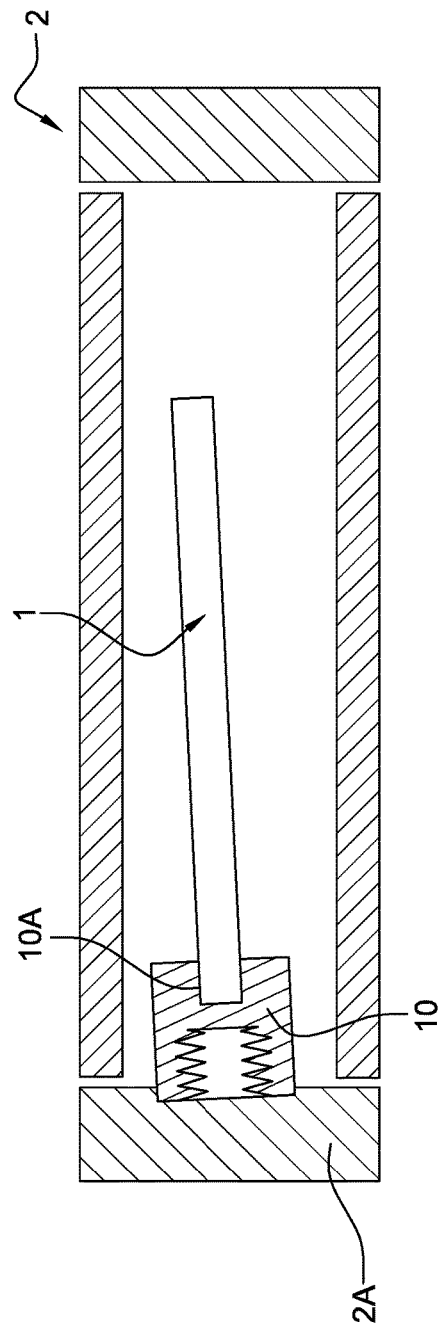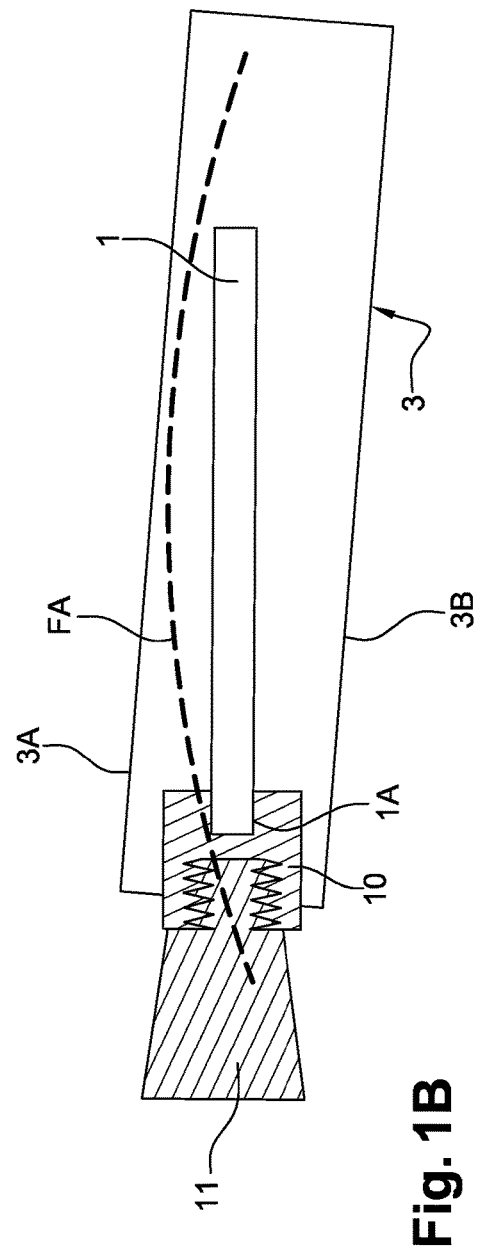
Fig. 1A
Fig. 1B

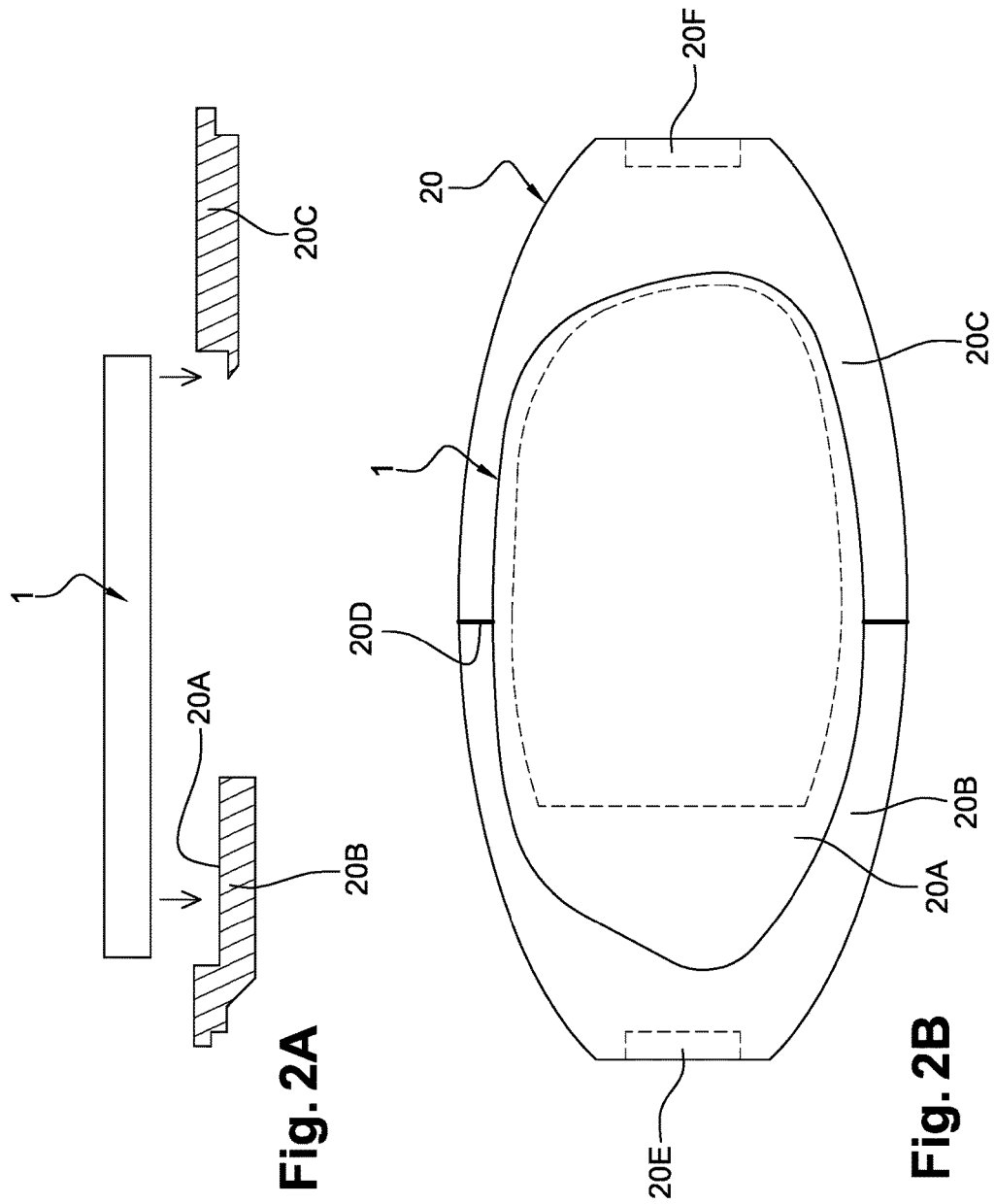

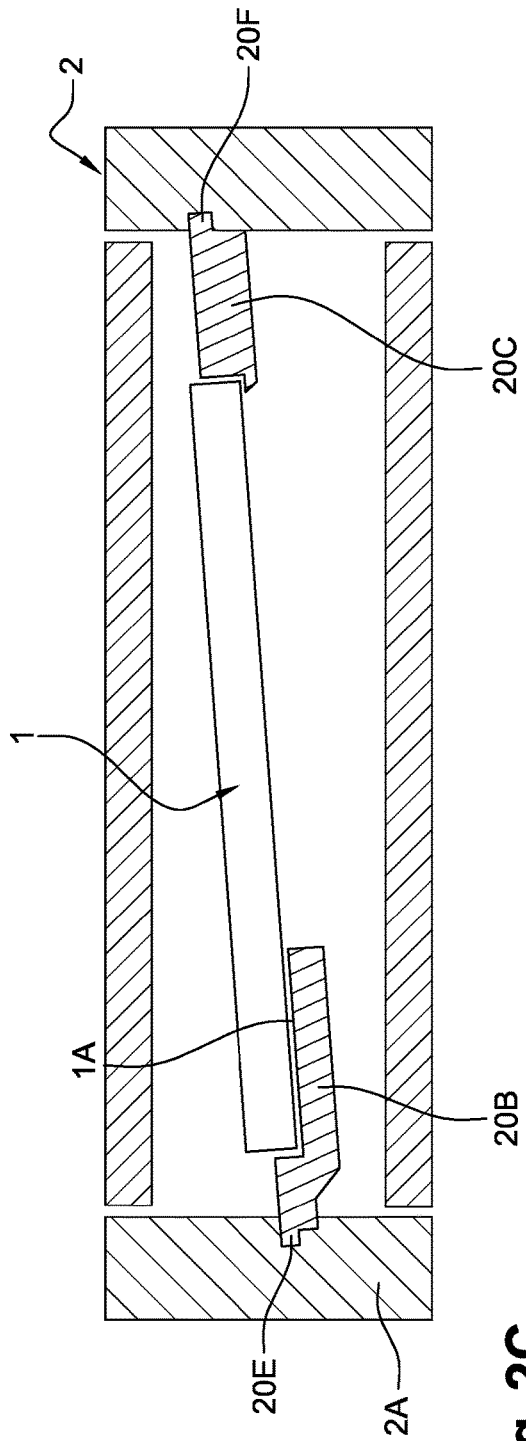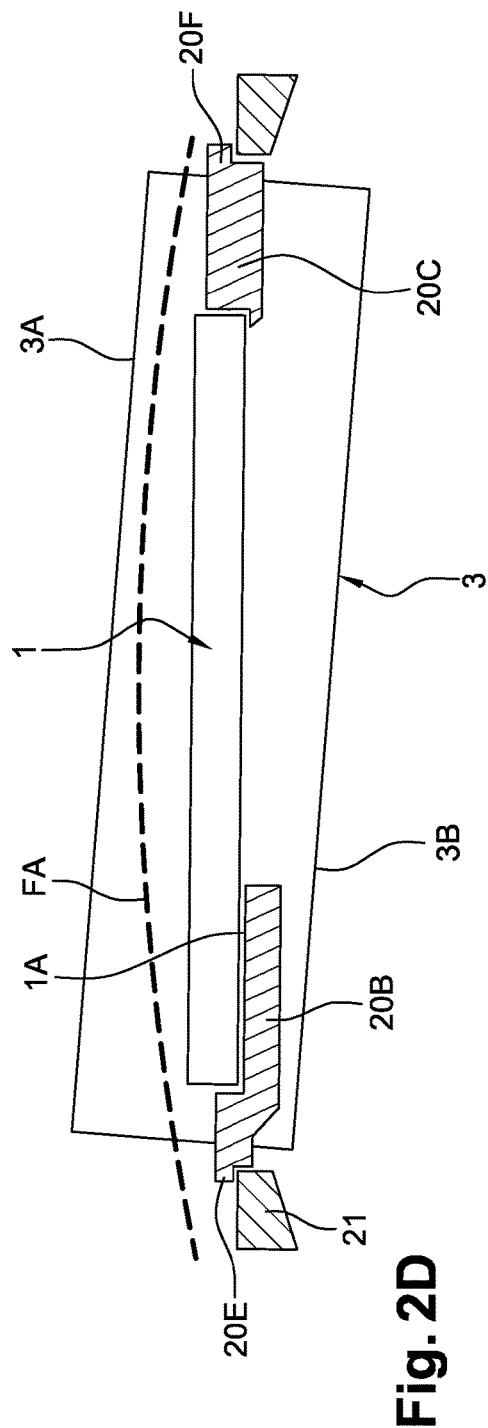

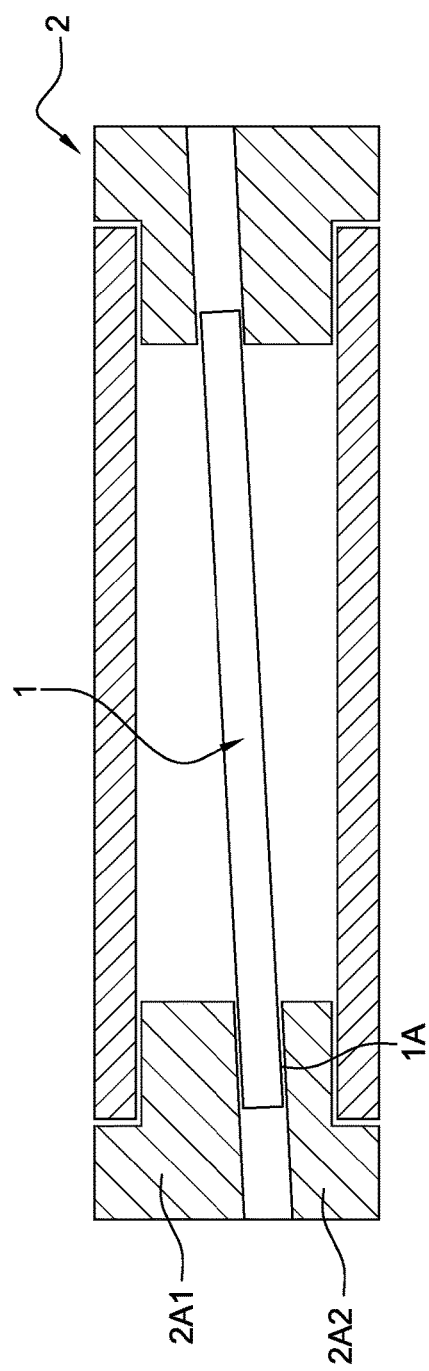
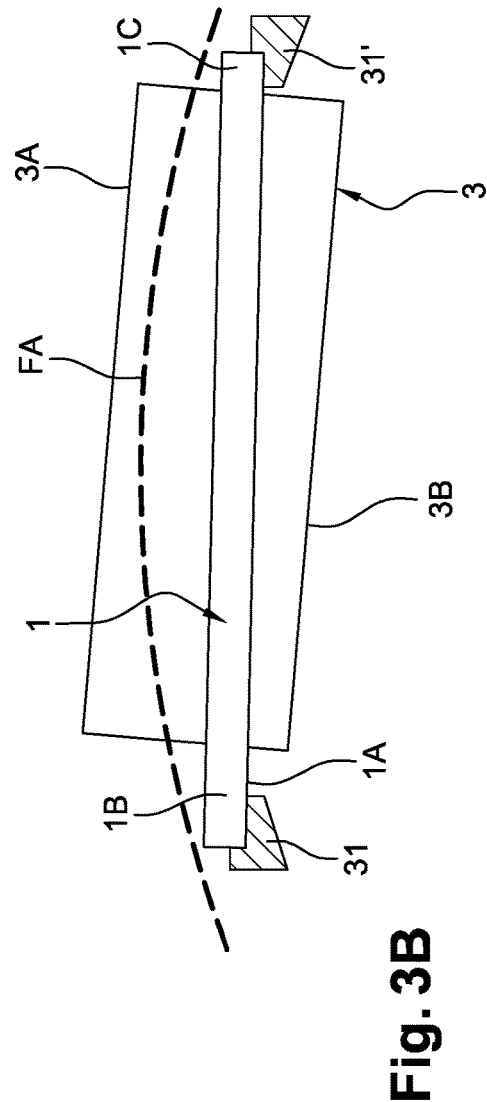
Fig. 3A
Fig. 3B

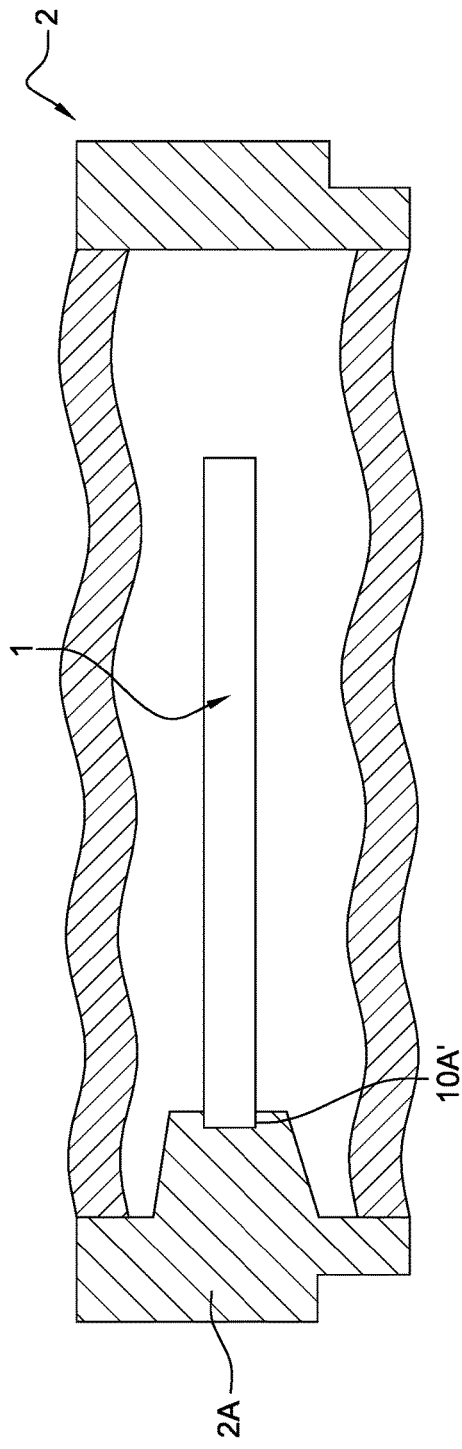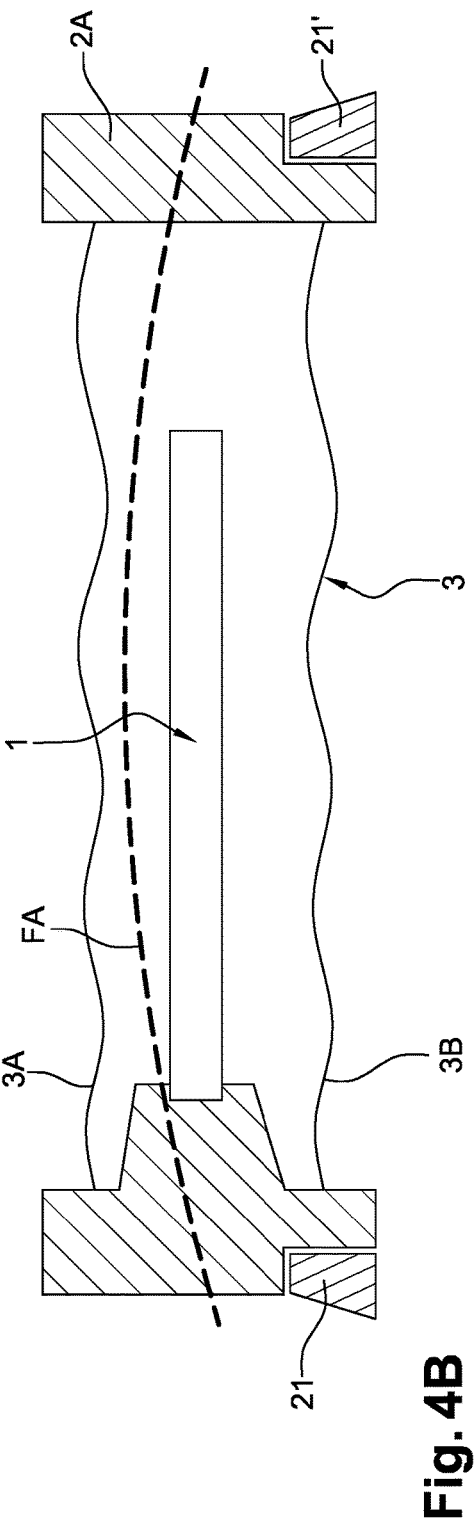

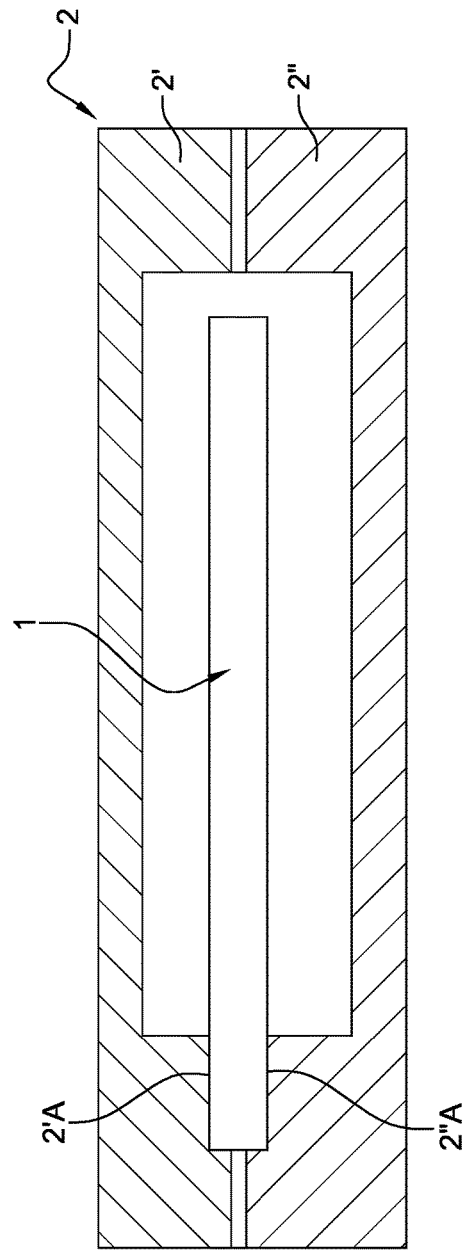
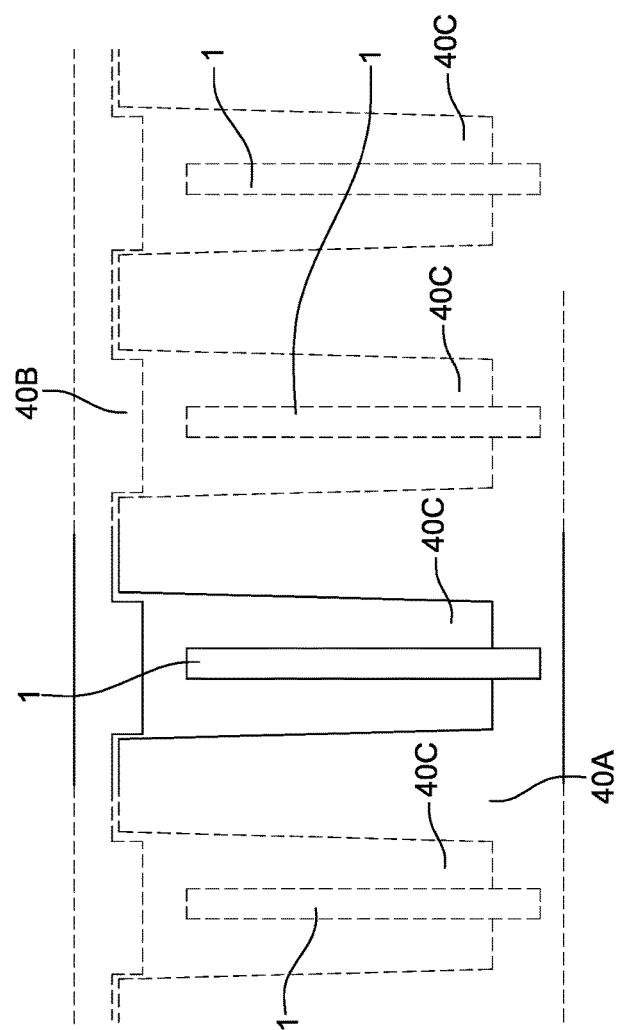
Fig. 5
Fig. 6

PROCESS FOR MANUFACTURING AN OPHTHALMIC LENS EQUIPPED WITH AN INSERT

The invention relates to a process for manufacturing an ophthalmic lens for a pair of spectacles, said lens being equipped with an insert.

It in particular relates to a lens intended to be used as an optical display, the insert being a waveguide intended to receive optical beams via an entrance surface and to guide said beams toward the eye of the wearer so as to create an informative image.

A process for manufacturing such a lens is described in patent document WO 2011/095379, in which a lens blank (also called a "puck") is molded and then processed by machining and polishing at least one of its faces in order to form the front or back face of the lens.

In this document, the mold comprises a first mold portion intended to mold the front face of the puck, and a second portion intended to mold the back face of the puck. A pad joined to the second portion of the mold is, on the one hand, intended to form a molded cavity, in order to produce the free surface through which the optical beams enter into the waveguide, and on the other hand, used to receive the waveguide before the molding. To do this, the waveguide is temporarily fastened to the pad before the molding, preferably by adhesive bonding by means of a monomer layer.

Such a process requires such a pad to be produced with very strict parallelism and alignment tolerances since the correct positioning of the waveguide inside the mold and therefore in the molded puck depends on its shape, its dimensions and its position.

Moreover, the waveguide must be adhesively bonded to the pad with a high positional precision for the same reason.

Specifically, the precise three-dimensional position of the waveguide in the finished lens is of utmost importance. The assembly must meet precise optical specifications, both with respect to real vision (formation on the eye of an image borne by light passing through both faces of the glass) and with respect to the informative display (formation on the eye of an image transported by the waveguide). It is also necessary to minimize component volumes, in order to obtain a lens that is light and thin. The lens must also meet esthetic criteria.

Lastly, it is essential for the integrity of the waveguide not to be compromised during the machining and polishing of at least one of the faces of the puck, to form the front and back faces of the lens. More precisely, a poorly positioned waveguide may cause the tool to collide with the waveguide and it to break during the machining of the front and/or back face of the puck, or even when the lens is trimmed to give it a shape corresponding to that of the frame in which it must be fitted.

Therefore, it turns out that mass production is not possible with such a process because of the cost of producing molds with precise dimensional tolerances.

The invention solves these problems by providing a process for manufacturing a lens blank or puck that ensures the insert is located in a very precise position in the finished ophthalmic lens, while remaining manufacturable by means of relatively simple tools.

To do this, the invention proposes a process for manufacturing an ophthalmic lens equipped with an insert, by means of a mold, comprising:

a step of molding a puck comprising two frontal faces and said insert positioned between said faces; and a step of machining at least one of said faces of said puck in order to form one of the front or back faces of said ophthalmic lens, the insert being positioned relative to one portion of the mold before said molding step, characterized in that an element associated with the insert or an imprint of this element left in the puck after the element has been removed comprises at least one of its portions providing a positional reference relative to said insert in the machining step.

An ophthalmic lens is intended to be placed in front of the eye of a wearer in order to correct his vision, protect the eye or attenuate the amplitude of the light arriving on the retina of the eye.

The insert may be any element inserted into the lens for which the position in the latter is critical with regard to optical constraints or to meeting thickness specifications or to avoiding the risk of breakage. By way of example, it may be an optical waveguide such as mentioned above, or a polarizing film or a controllable optical module such as an active Fresnel module, an electrochromic module, a photochromic module, a fluidic module or a scattering module.

The process allows the position of the insert to be identified by means of the mechanical reference, and then at least one of the front and back faces to be machined depending on the identified position. The one or more references may be used in a machining clamp or equivalent, but may also be identified by a probe after the puck has been positioned in a machine tool.

The material used for molding of the lens may be a thermosetting resin such as an acrylic resin and it may be subjected to a polymerizing cycle and optional bake.

According to a first preferred embodiment, said element is a part independent from the insert and relative to which the insert is positioned.

According to a second preferred embodiment, said puck furthermore comprising a peripheral lateral face, said element is that portion of the mold which is intended to mold said peripheral lateral face of the puck.

According to a third preferred embodiment, said element is at least one edge of the insert.

The invention also relates to an ophthalmic lens intended to be used as an optical display and manufactured by means of such a process, said ophthalmic lens being intended to be placed in front of one eye of a wearer, the insert being a waveguide intended to receive optical beams via an entrance surface located on the flush edge of the insert and to guide said optical beams toward the eye of the wearer so as to create an informative image on said eye.

Lastly, the invention relates to an ophthalmic lens manufactured by means of such a process, the insert being a controllable optical module.

The invention is described in greater detail below with reference to the figures, which show only preferred embodiments of the invention.

FIGS. 1A and 1B are cross-sectional views illustrating a first variant embodiment of the process according to the invention.

FIGS. 2A to 2D are cross-sectional and top views illustrating a second variant embodiment of the process according to the invention.

FIGS. 3A to 3C are cross-sectional and top views illustrating a third variant embodiment of the process according to the invention.

FIGS. 4A and 4B are cross-sectional views illustrating a fourth variant embodiment of the process.

FIG. 5 is a cross-sectional view illustrating a mold composed of two separate parts.

FIG. 6 is a cross-sectional view illustrating the process according to one variant embodiment, allowing a plurality of pucks equipped with an insert to be produced simultaneously.

Figure 3C:
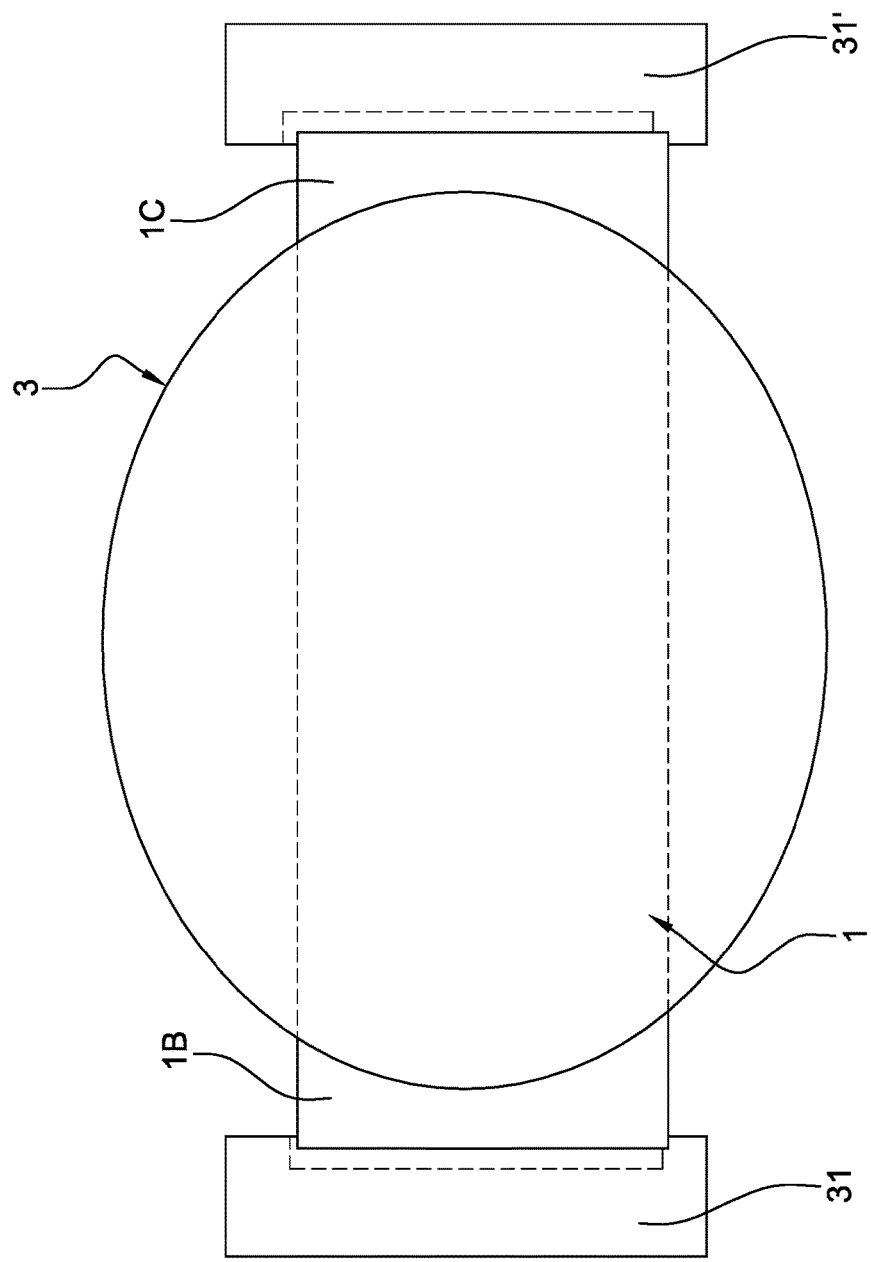

The invention relates to a process for manufacturing an ophthalmic lens equipped with an insert 1, by means of a mold 2, comprising:

a step of molding a puck 3 comprising two faces 3A, 3B and said insert 1 positioned between these faces; and a step of machining at least one of said faces 3A, 3B of said puck 3 in order to form one of the front or back faces of said ophthalmic lens, the insert 1 being positioned relative to one portion of the mold before said molding step.

According to the invention, generally, an element associated with the insert 1 or an imprint of this element left in the puck 3 after the element has been removed comprises at least one of its portions providing a positional reference relative to said insert in the machining step.

Although specifically described below and shown in the figures for the case where the insert 1 is a waveguide intended to receive optical beams, via an entrance surface 1A located on a flush edge of the insert, and to guide said optical beams toward the eye of the wearer so as to create an informative image on the eye, the ophthalmic lens being intended to be used as an optical display and being intended to be placed in front of one eye of a wearer, the process may apply to any element inserted into the lens for which the position in the latter is critical with regard to optical constraints or to meeting thickness specifications or to avoiding the risk of breakage. As specified above, the insert may also be a controllable optical module, such as an active Fresnel module, an electrochromic module, a photochromic module, a fluidic module or a scattering module.

According to a first variant embodiment shown in FIGS. 1A and 1B, the element is a part 10 that is independent from the insert 1 and relative to which the insert 1 is positioned by inserting one of its lateral edges into an indentation 10A in the element.

The insert 1 is positioned beforehand in this tapped part or inclusion 10, which is fitted into the peripheral lateral wall 2A of the mold. The element 10 is equipped with a fastening means 11 able to interact with a positional reference used in the machining step. The fastening means 11 is an arrangement screwed into the thread of the part 10, as may be seen in FIG. 1B. After the puck has been cured and demolded, the inclusion 10 is therefore screwed onto the fastening means 11. This guarantees the position of the insert 1, either during machining of one of the faces of the puck 3, or during implementation of an intermediate blocking operation. Instead of a screw/thread arrangement, a well adjusted snap fastening system could be used.

Either by means of a clamp of a machining tool, a blocking tool and/or a probe, the fastening means 11 serves as a mechanical reference for the production by machining of the front face FA of the finished lens, as shown in FIG. 1B, once the puck has been cured and demolded. By virtue of this mechanical reference, the machining of this front face FA may be parameterized with great precision. In this embodiment, the inclusion 10 and the fastening means 11 may be machined at the same time as the puck 1, which therefore makes these elements consumable elements.

The inclusion 10 comprises a molding segment leaving flush one edge of the insert 1, on the side of that face 3B of the puck which is intended to form the back face of the ophthalmic lens, in order to form the entrance surface 1A. According to this variant, the inclusion also comprises a molding segment leaving flush one edge of the insert 1, on the side of that face 3A of the puck which is intended to form the front face FA of the ophthalmic lens, when the inclusion 10 is removed after the machining.

According to a second variant embodiment shown in FIGS. 2A to 2D, the element is a part 20 independent from the insert 1 and relative to which the insert 1 is positioned by inserting its lower frontal face into a peripheral indentation 20A of this part 20, which indentation 20A ensures a flush zone all the way around the lens of about 1 mm, allowing the lens equipped with its insert 1 to be subsequently fitted into the frame of a pair of spectacles.

In fact, here the part 20 is made up of two portions 20B, 20C each containing the indentation 20A, these two portions being joined at their junction 20D by interlocking or snap fastening in order to form a continuous closed indentation 20A in which the insert 1 is positioned beforehand, as illustrated in FIG. 2B.

Each portion 20A, 20B of the part also comprises a supporting end shoulder 20E, 20F.

For the molding of the puck 3 in the mold 2, these supporting shoulders 20E, 20F are snap fastened in the peripheral lateral wall 2A of the mold, which is preferably formed by a flexible elastomer seal, so as to correctly position the insert 1 inside this mold 2. Here, as shown in FIG. 2C, the part 20 and therefore the insert 1 borne by the latter are inclined relative to the frontal faces (here flat) of the puck to be manufactured.

Either by means of a clamp of a machining tool, a blocking tool and/or a probe 21, the supporting shoulders 20E, 20F serve as mechanical references for the machining of the front face FA of the finished lens, as shown in FIG. 2D, once the puck has been cured and demolded. By virtue of these mechanical references, the machining of this front face FA may be parameterized with great precision.

The part 20 or more precisely its portion 20B comprises a molding segment leaving flush one edge of the insert 1, on the side of that face 3B of the puck which is intended to form the back face of the ophthalmic lens, in order to form the entrance surface 1A, when the removable part 20 has been removed after the machining.

According to a third variant embodiment shown in FIGS. 3A to 3C, the positional reference element is directly at least one edge of the insert 1.

Here, for the case of an insert of substantially rectangular frontal shape, it is two different and opposite edges 1B, 1C of the insert, which protrude from the molded puck 3, that are used as the positional references.

Advantageously, that portion of the mold which is intended to mold the peripheral lateral face of the puck is made up of two portions 2A1, 2A2 that grip these edges of the insert before and during the molding step, as illustrated in FIG. 3A.

These lateral mold portions 2A1, 2A2 comprise a molding segment leaving flush one edge of the insert 1, on the side of that face 3B of the puck which is intended to form the back face of the ophthalmic lens, in order to form the entrance surface 1A. According to this variant, they also comprise a molding segment leaving flush one edge of the insert 1, on the side of that face 3A of the puck which is intended to form the front face of the ophthalmic lens, after the molding.

Either by means of a clamp of a machining tool, a blocking tool and/or a probe 31, 31', these edges of the insert 1 serve as mechanical references for the machining of the front face FA of the finished lens, as shown in FIGS. 3B and 3C, once the puck has been cured and demolded. By virtue of these mechanical references, the machining of this front face FA may be carried out with great precision.

The invention covers other variant embodiments that have not been precisely described above.

As described above, an element associated with the insert, which may be an independent part 10, 20 or an edge of the insert 1 itself, comprises at least one of its portions providing a positional reference relative to the insert, in the machining step.

This element may also be that portion of the mold which is intended to mold the peripheral lateral face of the puck 3 and that is left in place after the molding and before the machining, as illustrated in FIGS. 4A and 4B.

According to this other embodiment, the element is directly the peripheral lateral wall 2A of the mold, relative to which wall the insert 1 is positioned by inserting one of its lateral edges into an indentation 10A' in the element.

The insert 1 is therefore positioned beforehand in the peripheral lateral wall 2A of the mold and it is this peripheral lateral wall 2A that serves as a mechanical reference for the production by machining of the front face FA of the finished lens, as shown in FIG. 4B, once the puck has been cured and demolded, by means of a clamp of a machining tool, a blocking tool and/or a probe 21, 21'. By virtue of this mechanical reference, the machining of this front face FA may be parameterized with great precision.

The other frontal walls of the mold 2 may be flexible, as is depicted in FIG. 4a, since the faces 3A, 3B of the puck 3 that they mold are then machined and therefore do not need to be planar and precise.

Generally, as a variant, it may also be an imprint of the element associated with the insert 1 that, left in the puck after removal of the element, ensures this positional reference function.

In the case where an element consisting of an independent part 10, 20 is used, the lateral edge of the insert may be positioned by insertion into an indentation of the element 10 or one face of the insert 1 may be positioned by insertion into at least one indentation of the part 20.

Although in the precisely described variants the embodiment described is always that in which it is the front face FA of the finished lens that is machined, it goes without saying that the back face of the lens may be produced first in this way, a second machining step then, if required, being used to produce the other frontal face of the lens using the same process. The same mechanical reference may be used in both successive machining steps.

In situations where the mechanical reference cannot be reused after the first machining step, the second machining step is carried out in the conventional way by visually centering and blocking the already machined face.

Once it has been produced by machining, the front or back face of the lens is polished and both the front and back faces are then optionally treated, in a known way, with a lacquer or a mirror layer for example.

In the various figures described above, the mold is formed from two frontal faces and a peripheral lateral face. It goes without saying that the process according to the invention could be implemented with a concave mold composed only of two portions or with a single mold of unitary construction.

In FIG. 5, the positional reference element is directly one edge of the insert 1 and the mold 2 merely comprises two half-molds 2', 2" between which this edge of the insert 1 is gripped in respective notches 2'A and 2"A.

In FIG. 6, a matrix made up of two portions 40A and 40B comprising a plurality of cavities 40C serving as molds allows a large number of pucks equipped with inserts 1 to be produced simultaneously. The positional reference element is directly one edge of the insert 1, inserted into a wall of a portion 40A of the battery.

The positional reference(s) obtained by virtue of the invention may be used by means of a machining clamp, a blocking ring or a robot gripper. Use of a probe or optical means, such as a video camera or goniometer, may also be envisioned.

The molds schematically shown in FIGS. 1 to 5 are intended to mold thermosetting resins, that they could also be adapted to processes for injection molding thermoplastics.

In contrast, the battery of molds shown in FIG. 6 is intended to mold thermoplastics, but it could also be adapted to processes for injection molding thermosetting resins.

The invention claimed is:

1. A process for manufacturing an ophthalmic lens equipped with an insert, by means of a mold, comprising:
    molding a puck comprising two faces and said insert positioned between said faces; and
    machining at least one of said faces of said puck in order to form one of a front or a back face of said ophthalmic lens,
    the insert being positioned relative to one portion of the mold before said molding, wherein
    an element associated with the insert comprises at least one of its portions providing a positional reference relative to said insert in the machining, wherein
    said element is a part independent from the insert and relative to which the insert is positioned, and wherein
    said face of the insert is positioned by insertion into at least two indentations in said part.

2. The process as claimed in claim 1, wherein
    said element is provided with a fastening means operable to interact with a positional reference used in the machining.

3. The process as claimed in claim 1, said element is at least one edge of the insert.

4. The process as claimed in claim 3, wherein said element is composed of at least two different edges of the insert.

5. The process as claimed in claim 3, wherein that portion of the mold which is intended to mold a peripheral lateral face of the puck is made up of two portions that grip said edge of the insert or said edges of the insert before and during said molding.

6. The process as claimed in claim 1, wherein said element or the imprint of said element has a shape suitable for interacting with a clamp of at least one of a machining tool and a blocking tool.

7. The process as claimed in claim 1, wherein said element or one portion of the mold comprises a molding segment leaving flush one edge of the insert, on the side of a face of the puck which is intended to form the back face of said ophthalmic lens.

8. A process for manufacturing an ophthalmic lens equipped with an insert, by means of a mold, comprising:
    molding a puck comprising two faces and said insert positioned between said faces; and
    machining at least one of said faces of said puck in order to form one of a front or a back face of said ophthalmic lens,
    the insert being positioned relative to one portion of the mold before said molding, wherein an element associated with the insert comprises at least one of its portions providing a positional reference relative to said insert in the machining, wherein said element is a part independent from the insert and relative to which the insert is positioned, and wherein said element is provided with a fastening means operable to interact with a positional reference used in the machining.

9. The process as claimed in claim 8, wherein said part is removable and is removed after said machining.

10. A process for manufacturing an ophthalmic lens equipped with an insert, by means of a mold, comprising:

molding a puck comprising two faces and said insert positioned between said faces; and machining at least one of said faces of said puck in order to form one of a front or a back face of said ophthalmic lens, the insert being positioned relative to one portion of the mold before said molding, and said puck further comprising a peripheral lateral face, wherein an element associated with the insert or an imprint of this element left in the puck after the element has been removed comprises at least one of its portions providing a positional reference relative to said insert in the machining, and wherein said element is that portion of the mold which is intended to mold said peripheral lateral face of the puck.

11. A process for manufacturing an ophthalmic lens equipped with an insert, by means of a mold, comprising:

molding a puck comprising two faces and said insert positioned between said faces; and machining at least one of said faces of said puck in order to form one of a front or a back face of said ophthalmic lens, the insert being positioned relative to one portion of the mold before said molding, and said puck further comprising a peripheral lateral face, wherein at least one of the edges of the insert or an imprint of an element associated with the insert left in the puck after the element has been removed comprises at least one of its portions providing a positional reference relative to said insert in the machining.

12. The process as claimed in claim 11, characterized in that wherein said element is composed of at least two different edges of the insert comprise at least one of its portions providing a positional reference relative to said insert in the machining.

13. The process as claimed in claim 11, wherein that portion of the mold which is intended to mold a peripheral lateral face of the pick is made up of two portions that grip said edge of the insert or said edges of the insert before an during said molding.

14. An ophthalmic lens used as an optical display, said ophthalmic lens being placed in front of one eye of a wearer, the ophthalmic lens comprising:

a front and a back face, wherein the ophthalmic lens is manufactured by:

molding a puck comprising two faces and an insert positioned between said two faces, and machining at least one of said faces of said puck in order to form one of the front or the back face of said ophthalmic lens, the insert is positioned relative to one portion of the mold before said molding, an element associated with the insert comprises at least one of its portions providing a positional reference relative to said insert in the machining, said element is a part independent from the insert and relative to which the insert is positioned, and said face of the insert is positioned by insertion into at least two indentations in said part, the insert is a waveguide receiving optical beams via an entrance surface located on said flush edge of the insert and guiding said optical beams toward the eye of the wearer so as to create an informative image on said eye.

15. An ophthalmic lens comprising:

a front and a back face, wherein the ophthalmic lens is manufactured by:

molding a puck comprising two faces and an insert positioned between said faces, and machining at least one of said faces of said puck in order to form one of the front or the back face of said ophthalmic lens, the insert is positioned relative to one portion of the mold before said molding, an element associated with the insert comprises at least one of its portions providing a positional reference relative to said insert in the machining, said element is a part independent from the insert and relative to which the insert is positioned, and said face of the insert is positioned by insertion into at least two indentations in said part.

16. The ophthalmic lens of claim 15, wherein the insert is a controllable optical module.

17. The ophthalmic lens of claim 16, wherein said puck comprises a peripheral lateral face, and wherein said element is a portion of the mold which is intended to mold said peripheral lateral face of the puck.

18. The ophthalmic lens of claim 16, wherein the element is a part independent from the insert and relative to which the insert is positioned.

19. The ophthalmic lens of claim 18, wherein a lateral edge of the insert is positioned by insertion into an indentation in said element.

20. The ophthalmic lens of claim 18, wherein one face of the insert is positioned by insertion into at least one indentation in said part.

* * * * *